(12) United States Patent
Saether et al.

(10) Patent No.: US 11,891,242 B2
(45) Date of Patent: Feb. 6, 2024

(54) SYSTEM FOR STORING RECYCLABLE CONTAINERS

(71) Applicant: Tomra Systems ASA, Asker (NO)

(72) Inventors: Geir Saether, Asker (NO); Kristian Hovde, Oslo (NO)

(73) Assignee: TOMRA SYSTEMS ASA, Asker (NO)

( * ) Notice: Subject to any disclaimer, the term of this patent is extended or adjusted under 35 U.S.C. 154(b) by 154 days.

(21) Appl. No.: 17/356,663

(22) Filed: Jun. 24, 2021

(65) Prior Publication Data
US 2022/0106110 A1 Apr. 7, 2022

(30) Foreign Application Priority Data
Oct. 7, 2020 (IE) .................................. S2020/0224

(51) Int. Cl.
*B65F 1/14* (2006.01)
*B65F 9/00* (2006.01)

(52) U.S. Cl.
CPC .............. *B65F 1/1405* (2013.01); *B65F 9/00* (2013.01); *B65F 2210/12* (2013.01)

(58) Field of Classification Search
CPC .. B65F 9/00; B65F 5/005; B65F 3/143; B65F 3/14; B65F 3/0209; B65F 2240/1564; B65F 2240/12; B65F 2240/1126; B65F 2210/179; B65F 2210/162; B65F 2210/12; B65F 2003/006; B65F 1/1405; B65F 1/10
See application file for complete search history.

(56) References Cited

U.S. PATENT DOCUMENTS

| 2,823,799 A * | 2/1958 | Gangell ................. | B60N 3/086 224/279 |
| 4,155,586 A * | 5/1979 | Flynn ........................ | B65F 3/00 292/201 |
| 4,796,926 A * | 1/1989 | Rapsilver ................ | E03F 1/008 285/179 |
| 5,829,091 A * | 11/1998 | Ingram ..................... | B60S 1/64 15/313 |

(Continued)

FOREIGN PATENT DOCUMENTS

| CN | 202129883 U | 2/2012 |
| CN | 108372607 A | 8/2018 |

(Continued)

*Primary Examiner* — Glenn F Myers
(74) *Attorney, Agent, or Firm* — Kagan Binder, PLLC

(57) ABSTRACT

A system for storing recyclable containers, such as used food or beverage containers, including a storage for housing recyclable containers, the storage having a set of inner surfaces which defines a storage volume for the recyclable containers; a transporting channel, the transporting channel including an inlet port and an outlet port, wherein the inlet port is arranged to receive compressed and/or uncompressed recyclable containers, and the outlet port being arranged in at least one of the inner surfaces in the set of inner surfaces, a force feeding transporting mechanism configured to transport transfer at least one recyclable container through the transporting channel, and into the storage volume via the outlet port, a centre axis of the outlet port of the transporting channel is directed upwards from the horizontal plane at an angle, the angle being within the range of 15° and 85° at the outlet port of the transporting channel.

14 Claims, 6 Drawing Sheets

(56) References Cited

U.S. PATENT DOCUMENTS 9,845,199 B2   12/2017   Hartung et al.

FOREIGN PATENT DOCUMENTS

| CN | 108636538  | A  | 10/2018 |
| CN | 208894377  | U  | 5/2019  |
| JP | 2003231121 | A  | 8/2003  |
| JP | 2008238460 | A  | 10/2008 |
| WO | 2016162882 | A1 | 10/2016 |

* cited by examiner

SYSTEM FOR STORING RECYCLABLE CONTAINERS

TECHNICAL FIELD OF THE INVENTION

The invention relates to a system for storing recyclable containers, such as used food or beverage containers.

BACKGROUND

Proper recycling of used containers is essential for making the handling of product packaging more sustainable. The containers may for example be used for storing food or a beverage, examples include soda cans, water bottles and milk cartons. For example, reverse vending machines (RVM) are commonly used in e.g. stores and supermarkets to collect used containers from consumers. After being collected the containers are stored by the store or supermarket at a temporary storage prior to being picked-up and transported to e.g. a central recycling site or sorting station for being recycled. At the recycling site or sorting station containers of different material types are separated and sorted before they are processed, and their material repurposed for new products e.g. new containers.

The containers stored at storage spaces according to the prior art are many times compressed to save space. As the containers are pressed together they many times become entangled and may even fuse together, making the process of separating and sorting them into e.g. different material streams difficult and costly and/or making the recycled material unsuitable for certain types of recycling processes as the properties of the recycled material may have been altered e.g. when the material melt while being compressed. For instance, during compression the plastic material of one container may be contaminated with a different type of plastic material from another container or a container may be contaminated with other substances or material fragments present in the storage, such as grease or sand. Consequently, containers which have been stored at a temporary storage space may be difficult to handle and process and less suitable for some recycling processes.

SUMMARY OF THE INVENTION

It is an object of the present invention to overcome or at least alleviate one or more of the drawbacks presented above.
In view of the shortcomings of the existing solutions there is a need for providing facilitated handling of collected recyclable containers, e.g. facilitating the sorting of co-mingled containers into different material streams.

According to a first aspect of the invention there is provided a system for storing recyclable containers, such as used food or beverage containers, the system comprising: a storage for housing recyclable containers, the storage having a set of inner surfaces which defines a storage volume for the recyclable containers; a transporting channel, the transporting channel comprising an inlet port and an outlet port, wherein the inlet port is arranged to receive compressed and/or uncompressed recyclable containers, and the outlet port is attached to at least one of the inner surfaces in the set of inner surfaces, a force feeding transporting mechanism configured to transfer at least one recyclable container through the transporting channel and into the storage volume via the outlet port, characterized in that, the transporting channel is directed upwards from the horizontal plane at an angle within the range of 15° and 85° at the outlet port of the transporting channel.

Said system for storing recyclable containers may also be referred to as a storage arrangement for recyclable containers, wherein said storage arrangement for recyclable containers, such as used food or beverage containers, comprises: a storage for housing recyclable containers, the storage having a set of inner surfaces which defines a storage volume for the recyclable containers; a transporting channel, the transporting channel comprising an inlet port and an outlet port, wherein the inlet port is arranged to receive compressed and/or uncompressed recyclable containers, and the outlet port is attached to at least one of the inner surfaces in the set of inner surfaces, a force feeding transporting mechanism configured to transfer at least one recyclable container through the transporting channel and into the storage volume via the outlet port, characterized in that, the transporting channel is directed upwards from the horizontal plane at an angle within the range of 15° and 85° at the outlet port of the transporting channel.

All statements made below regarding said system for storing recyclable containers also applies to the storage arrangement for recyclable containers.

In relation to this invention the term set of inner surfaces denotes the material layer that defines the storage space. If the storage has the shape of a hollow cuboid the set of inner surfaces comprises the six inner surfaces of the cuboid. If the storage has the shape of an open top container, the set of inner surfaces comprises all the present inner surfaces of the container. If the storage has the shape of a closed container, the set of inner surfaces comprises the inner surfaces of the container that encloses the storage space.

It is understood that the storage volume is not limited to storage volumes completely encased by inner surfaces. The storage volume may be partially open to the surroundings while still capable of housing recyclable containers. For example, the inner surfaces may be inner walls which defines the horizontal extent of the storage volume. The inner surfaces may further comprise an inner floor which defines a bottom surface of the storage volume. The inner surfaces may define a storage with an at least partially open top portion. In such arrangements, gravity in combination with the inner surfaces will keep the recycled containers in the storage volume. The storage volume may be a storage volume of any suitable shape.

Optionally, the maximum pressure provided by the force feeding transporting mechanism may be selected or controlled such that the height of the bulk of containers fed into the storage never reaches the top of the storage space, this is advantageous e.g. when the storage is an open storage or a partially open storage as the feeder then contributes to preventing an overflow of containers. The actual force feeding transporting mechanism for transporting containers from the inlet to the outlet of the transporting channel may be arranged according to common practise, and may e.g. be selected within a group comprising: a screw feeder and/or compactor, a plunger, and a pressurised air device.

According to some embodiments, the transporting channel passes through at least one of the inner surfaces in the set of inner surfaces.

Optionally, instead of the transporting channel being attached to at least one of the inner surfaces in the set of inner surfaces, the transporting channel may pass through at least one of the inner surfaces in the set of inner surfaces and being arranged such that there is a gap extending circumferentially around the transporting channel between the transporting channel and inner surface(s) that the transporting channel is extending through.

Furthermore, the storage may comprise a lid, the lid being adapted to be closed and opened to respectively isolate and expose the storage volume to the surroundings. Alternatively, the inner surfaces may completely outline the storage volume and form a fully enclosed hollow structure.

In the case the storage is at least partially open, a net or tarpaulin may be used to cover the opening such that the containers do not fall out of the storage e.g. during transportation.

The storage be made of a rigid or flexible material. Such as metal, wood, plastic or textile or a combination of any of these materials. Examples of storages includes sacks, shipping containers, dumpsters (e.g. roll-off dumpsters) with varying sizes and volumes. The storage may have a storage volume of 0.3 m³ up to 30 m³ or up to 50 m³.

With used or recyclable containers, it is meant packages of metal, plastic, paper, cardboard, or a combination thereof. The recyclable containers may be of varying types and sizes. Examples of containers includes metal cans or plastic bottles. The containers may be co-mingled, i.e. a mix of containers of different materials e.g. plastic bottles and aluminium cans, which many times are recycled by different processes and therefor needs to be sorted in different material streams.

Although the most common containers are drinking containers, the present system is also suitable storing other types of containers such as containers for consumer goods, containers for food and/or beverages such as milk cartons or containers for shampoo, cosmetics and household chemicals, including PET containers, aluminum containers and steel containers. The system may be adapted for being able to receive and process all or some of the different standard sizes of containers in different countries. It may e.g. be able to handle a mix 25 of 33 cl and 50 cl tin cans, as well as 33 cl, 50 cl and 1.5 l PET bottles.

In relation to this invention, the term direction of the transporting channel at the outlet port of the transporting channel denotes the mean direction or net direction in which the containers are forced just before being ejected into the storage space. According to one example, at the instance when the first container is ejected and leaves the transporting channel, it may be ejected into free space or the emptiness inside the container, where after it lands on one of the inner surfaces in the set of inner surfaces, e.g. a bottom inner side. When a plurality of containers has been ejected into the storage space, they may form a pile of containers covering the output port of the transporting channel, so the next container is ejected not into free space but into the pile of containers covering the output port of the transporting channel. The force feeding transporting mechanism continues to transfer containers into the storage space, either into free space or into the pile of containers, until the force feeding mechanism is not capable of forcing more containers into the storage space, or a sensor measuring the fill level (e.g. by measuring the force of the force feeding mechanism or the height of the pile of containers) detects that it is time to stop feeding containers into the storage.

The invention is at least partially based on the understanding that with a transportation channel directed upwards from the horizontal plane a pile-up of highly compressed recyclable containers, being pressed against a far side (with respect to the outlet port of the transporting channel) of the storage is avoided. With the invention, the main direction in which containers are forced to move comprises a vertical component (opposite to the direction of gravity) which forces containers upwards to fill the storage. It may be beneficial to ensure that more containers have a suitable compression ratio, sufficiently high to save space during storage and transportation but not so high that it makes the later processing and/or handling of the containers cumbersome.

With a transporting channel directed horizontally, the containers entering the storage will only be forced upwards by complex and unpredictable physical interaction with other containers. Primarily, the containers are forced horizontally and compressed against the far side of storage. As more and more containers enter the storage the downward pressure from the weight of above containers increases. To overcome the downward pressure an increased feeding force of containers entering through the horizontal transporting channel is necessitated and, as the containers are pressed together in the horizontal direction, they may eventually be forced upwards. As the pile-up region under enough pressure collapses before being established again. The compression ratio of containers ejected into the storage during later parts of the filling will thus have a considerably higher mean compression ratio compared to the containers ejected during earlier parts of the filling as a higher feeding force is needed to break the pile-up structure during late stage filling. As a result, many containers will have a too high compression ratio.

By compression ratio of a used food or beverage container it is meant the ratio between the volume of the container prior to compression and the volume of the container post compression. As the containers may rupture or be torn apart during compression a complimentary definition of compression ratio is the ratio between the volume of a sample of containers prior to compression and the volume of a sample of containers post compression, the prior and post compression samples having the same mass. According to one way of calculating the compression ratio, the volume of the storage is measured and the total uncompressed volume, being the total volume all each containers which is to be ejected into the storage until it is filled to capacity, is measured, The containers are transported by the force feeding transporting mechanism and ejected into the storage until it is filled to capacity, whereupon the compression ratio may be calculated by dividing the sum of the total uncompressed volume with the measured volume of the storage. Analogously, uncompressed containers may be provided in bulk, e.g. in bags of a standardized volume comprising a plurality of uncompressed containers. Bulks of containers are compressed and ejected into the storage until the storage is full. The compression ratio may then be calculated by dividing the sum of volume of each bulk of uncompressed containers (e.g. the standardized bag volume) with volume of the storage.

With the transporting channel directed upwards from the horizontal plane at an angle within the range of 15° and 85° at the outlet port of the transporting channel of the invention, the complex and unpredictable physical interaction between containers which forces them upwards is influenced and may be overruled by the upwardly directed force with which the containers are fed into the storage. As a result, containers ejected into the storage through the transporting channel might be exposed to a lower maximum pressure and the number of containers with too high compression ratio will thereby decrease.

According to one exemplifying embodiment, there is a desire to store the containers with a minimum compression to facilitate a re-fill of the containers. According to this embodiment, the transporting channel is directed upwards from the horizontal plane at an angle within the range of 15° and 85° at the outlet port of the transporting channel and the containers ejected into the storage may maintain the compression ratio they possessed prior to entering the infeed of the transporting channel of the present invention; e.g. being uncompressed or essentially uncompressed. In an alternative embodiment the containers are compressed when entering into the infeed and maintain the compression ratio they possessed prior to entering the infeed of the transporting channel of the present invention. In another exemplary embodiment the containers are received, and may be compressed by, a reverse vending machine (RVM) prior to entering the infeed of the transporting channel.

A further benefit of the invention is that the maximum stress exerted on the force feeding mechanism, and the storage as such, to fill a given storage may be lower compared to prior solutions with a horizontally directed transporting channel. This decreases mechanical wear and increases system uptime as less maintenance is needed.

According to some embodiments of the invention there is provided a system for storing recyclable containers, wherein at least 80% of the recyclable containers have a compression ratio of between 3 and 10, and preferably between 4 and 8.

The term compression ratio of a recyclable container denotes the ratio between the volume of the container prior to compression and the volume of the container post compression. For example, a compression ratio for a recyclable container in the storage may be 5, meaning the volume of the recyclable container has decreased with a factor of five.

Alternatively, at least 70%, 75%, 85%, or 90% of the recyclable containers have compression ratio of between 3 and 10, and preferably between 4 and 8. The percentage of recyclable containers having a compression ratio may be with respect to the volume of the containers. A compression ratio of between 3 and 10, and preferably between 4 and 8, is high enough such that much space is saved while still being low enough such that the containers are easily separated. The compression ratio of the recyclable containers inside the storage may have any distribution, such as being normally distributed. Moreover, the distribution of the compression ratio of the containers may change during filling. With the invention, the percentage of recyclable containers with a proper compression ratio of between 3 and 10, and preferably between 4 and 8 may be higher compared to prior solutions, e.g. at least 80%. Thus, a smaller portion of the recyclable containers will have a compression ratio of above 10, or preferably above 8, which facilitates sorting and separation of the containers at a central recycling site or sorting station.

According to some embodiments of the invention there is provided a system for storing recyclable containers wherein the angle at which the transporting channel is directed upwards is within an angle range, wherein the angle range is chosen from a group of angle ranges comprising: 15° to 60°, 30° to 50°, and 30° to 45°.

Any non-zero angle may achieve the technical effect of achieving or maintaining a lower compression ratio of the recyclable containers, when compared to a transporting channel directed horizontally. The angle with which the output port of the transporting channel is directed may be chosen depending on the properties of the storage, the desired distribution of the compression ratio for the containers in the storage and/or maximum force capabilities of the force feeding mechanism.

According to some embodiments of the invention there is provided a system for storing recyclable containers, wherein the angle, at which the transporting channel is directed upwards, is selected such that the direction of the transporting channel at the outlet port of the transporting channel intersects a centred half-area of an upper surface of the storage volume.

Alternatively, the angle, at which the transporting channel is directed upwards, is selected such that the direction of the transporting channel at the outlet port of the transporting channel intersects a centre-point of an upper surface of the storage volume. The centre-point being located at intersection between the upper surface and a vertical projection of an imaginary centre of mass of the upper surface, should it be made of an infinitesimally thin homogenous material.

An upper surface of the storage defines the vertical extension of the storage. For example, the upper surface may be the inner side which defines the height of the storage. It is understood that the height of the storage may be different for different parts of the storage.

For a closed storage the top inner surfaces delimit the upper surface.

For an at least partially open storage the upper surface may be delimited by at least one opening, the opening being delimited by an opening edge (i.e. a closed curve). For the at least one opening an imaginary closing surface is defined, wherein the imaginary closing surface is the surface of the smallest area which is delimited by the opening edge. The upper surface of an at least partially open storage may at least partially be delimited by the imaginary closing surface and may additionally be partially delimited by the top inner surfaces.

In relation to this invention, the expression that a direction intersects a surface or a point it is meant that an imaginary extension of the direction intersects the surface or point.

With a centred half-area of an upper surface it is meant a linearly downscaled representation of the upper surface, the linearly downscaled representation having half the area of the upper surface and is centred, such that the centre points of the upper surface and the centred half-area of the upper surface overlap, and aligned with the upper surface.

Accordingly, the angle of the transporting channel may be selected after the length, width and height of the storage as such. With a direction of the transporting channel at the outlet port of the transporting channel which intersects a centred half-area of an upper surface of the storage volume the recyclable containers are fed toward a mid-portion which is beneficial for maintaining a high degree of containers within a proper compression ratio range while also facilitating reaching a high fill-rate (i.e. the degree to which the storage volume is occupied by containers) of the. The angle of the upwards direction of the transporting channel may be a trade-off between achieving a high fill-rate of the storage and achieving, or maintaining, a proper compression ratio of the recyclable containers. For instance, a cuboid shaped storage wherein the outlet port of the transporting channel is located in an inner side of the short side may benefit from being directed from the horizontal plane with a smaller angle compared to an outlet port of the transporting channel located in an inner side of a long side of the same cuboid shaped storage.

According to some embodiments of the invention there is provided a system for storing recyclable containers, wherein the outlet port of the transporting channel is arranged in a lower half-portion of the storage.

The outlet port may be flush with an inner surface of the storage. Alternatively, the transporting channel may be arranged such that the outlet port is formed with some separation from an inner surface of the storage.

The lower half-portion of the storage may be defined as the half-portion disposed around a lower half of the vertical extent of the storage. The storage volume defined by the inner surfaces of the storage comprises a maximum or average vertical height, a lower half portion of the storage volume is then made up of all volume elements disposed at or below half the maximum or average vertical height. The lower half-portion of the storage is then the portion(s) of each inner surface which delimits a volume element of the storage volume disposed at or below half the maximum or average vertical height. Compressed recyclable containers may have a tendency decompress, as the material of the containers may be elastic. It may thus be preferable to fill containers from the bottom half-portion as the weight of above containers may prohibit the containers entering through the transporting channel from decompressing.

An outlet port of the transporting channel arranged in a lower half portion of the storage also provides the benefit of decreased system size. Additional components and sub-systems would normally be needed should the containers be transported to the top of a storage and dropped in from the above. Such components and sub-systems take up space and makes for a larger and bulkier system.

The force feeding transporting mechanism may be any mechanism adapted to move recyclable containers. The force feeding mechanism may be chosen from a group comprising a screw feeder, a plunger, a conveyor, a device ejecting pressurized air and combinations thereof. The transporting mechanism may further be adapted to compress the recyclable containers. For example, the screw feeder may be a screw compactor which compacts the recyclable containers while, or prior to, transporting them into the storage.

The recyclable containers may already be compressed or be uncompressed before being processed by the system, wherein the force feeding mechanism may be adapted to further compress the containers before ejecting the containers into storage at a direction suitable to maintain the compression ratio of a majority of the containers. For instance, the recyclable containers have compression ratio of 2 before entering the force feeding mechanism, and the force feeding mechanism compresses the containers to a compression ratio of 5 before ejecting the containers into the storage at a direction forming an angle of e.g. 45° with the horizontal plane. Resulting in that a majority (e.g. 80%) of the containers will maintain their suitable compression ratio of 5 while stored in the storage.

The containers may be received one-by-one or in bulk at the inlet port of the transporting channel, and the force feeding mechanism may be adapted to transport, and optionally compress, containers in bulk or one-by-one. Also, when the containers are received one-by-one, the force feeding mechanism may be adapted to transport, and optionally compress, containers in bulk and/or one-by-one. Moreover, when the containers are received one-by-one, the force feeding mechanism may be adapted to transport, and optionally compress, containers one-by-one and/or in bulk.

In alternative solutions, the storage for housing recyclable containers may comprise an inclined surface, such as an inclined far side (inclined inner far surface) and/or a ramp or wedge inside the storage. In relation to this invention the term inclined surface denotes an inner surface or ramp or wedge having an ascending surface forming an angle within the range 15° and 85° upwards from the horizontal plane.

One purpose of the inclined surface is similar to one of the purposes of the transport channel and force feeding transporting mechanism, i.e. to force the containers in the storage space upwards. When such an inclined surface is used the transporting channel may have a horizontal direction or even being directed downwards. When making contact with the inclined surface the containers are deflected upwards. In solutions wherein the storage comprises an inclined surface or ramp or wedge the direction of the transporting channel is such that the mean or net direction of the containers being ejected into the storage intersects the inclined surface or the closest surface of the ramp or wedge.

BRIEF DESCRIPTION OF THE DRAWINGS

These and other aspects of the present invention will now be described in more detail, with reference to the appended drawings showing exemplary embodiments of the present invention, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1A:
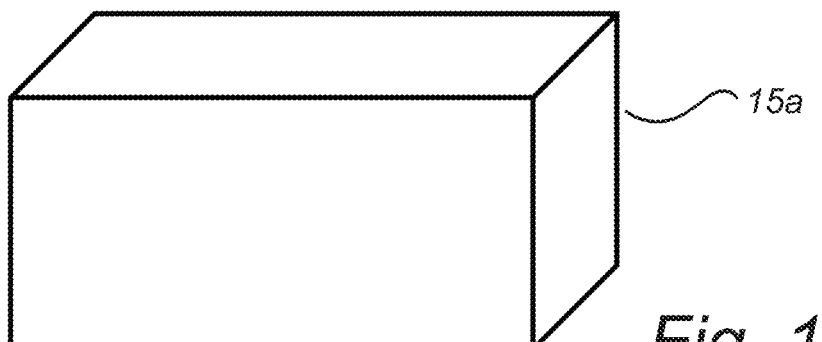
FIGS. 1a, 1b and 1c are perspective views of an exemplary storage volume.

FIG. 1a depicts an exemplary cuboid shaped storage volume 15a. The inner surfaces of the storage may delimit e.g. each side of the cuboid except for a top side. Alternatively, the inner surfaces may delimit all six sides and completely enclose the storage volume 15a. A storage volume 15a shaped as a cuboid may be oriented e.g. such that it is wider than it is tall or such that it is taller than it is wide.

Figure 1B:
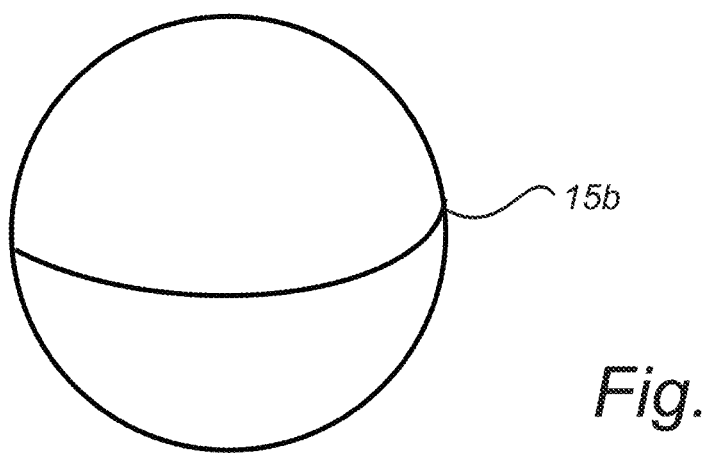

In FIG. 1b there is illustrated a storage volume 15b in the shape of a sphere. As described in the above the inner surfaces of the storage may completely delimit the storage volume 15b or partly delimit the storage volume. For example, the storage may have at least one opening (which may be closable with a lid) which exposes the storage volume 15b to the surroundings. According to one example, the one or more openings are arranged in an upper portion of the storage, such that containers ejected into the storage volume 15b do not fall out of the storage volume 15b when the lid is opened.

Figure 1C:
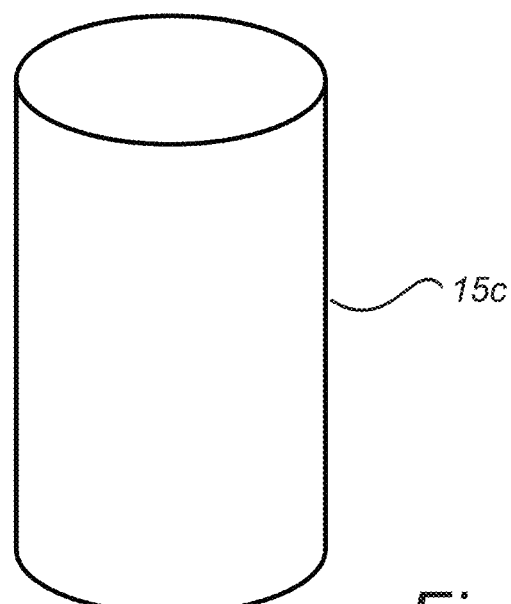

With reference to FIG. 1c another exemplary storage volume 15c is illustrated, shaped as a cylinder. The storage defining the storage volume 15c may be oriented in an upright position (i.e. similar to a silo) or in a horizontal position (i.e. oriented similar to a liquid transport tank used on trucks) or having any orientation therebetween.

The storage volume may have a more complex three-dimensional shape wherein e.g. one or more portions of the shapes shown in FIG. 1abc are replaced by a flat or curved surface.

Figure 2A:
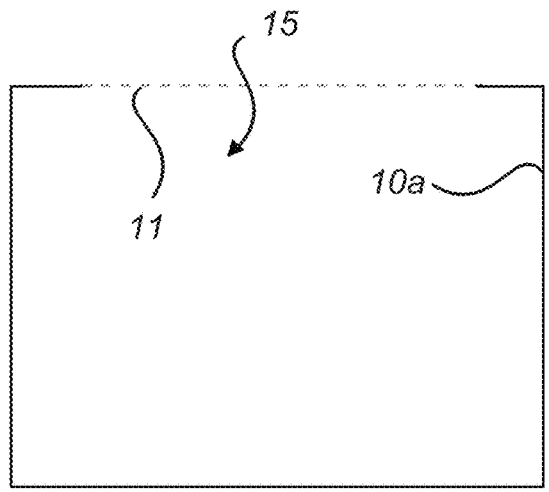
FIGS. 2a, 2b, 2c and 2d are cross-sectional views of an exemplary storage for housing recyclable containers according to embodiments of the present invention.

In FIG. 2a a cross-sectional view of a partially open storage 10a is depicted. The storage volume 15 is delimited by the inner surfaces of the storage 10a and the imaginary closing surface of the opening 11. As discussed in the above the imaginary closing surface of an opening 11 is the surface of the smallest area which is encircled by the edge of the opening 11.

With a storage comprising at least one opening 11 or an at least partially open storage 10a it is meant a storage with an opening 11 large enough such that a recyclable container (which may be compressed or torn apart) can pass through. A storage may be of a textile material, a reinforced textile material, a woven or flexible plastic material or made of a fine mesh material may still be considered as fully enclosed due to the holes of the mesh being smaller than the recyclable containers, which may be compressed.

Figure 2B:
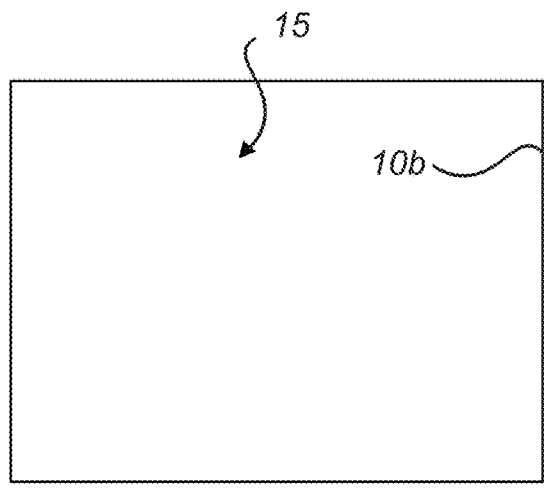

FIG. 2b depicts a cross-section of a closed storage 10b. The inner surfaces of the storage 10b enclose and completely delimit the storage volume 15.

Figure 2C:
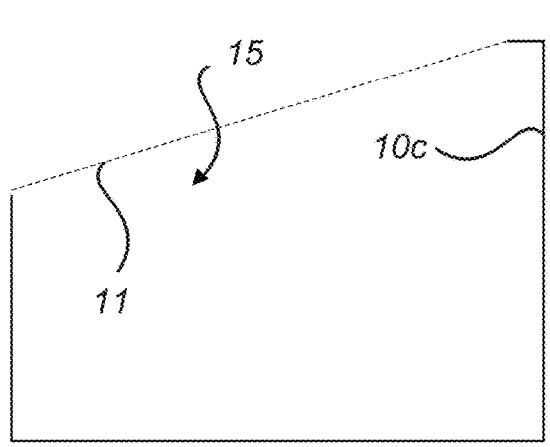
Figure 2D:
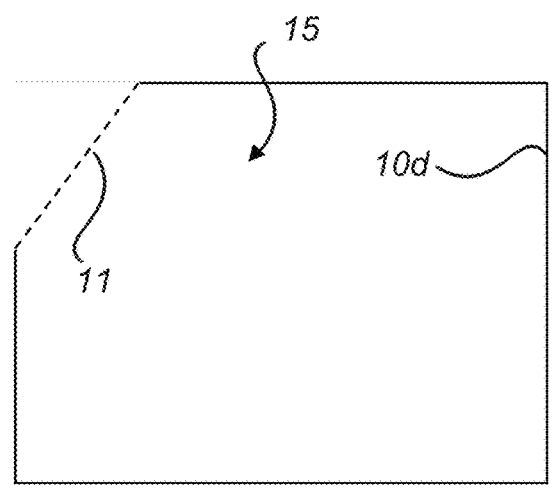

With reference to FIG. 2c and FIG. 2d there is depicted a storage 10c, 10d being at least partially open. The storage 10c, 10d has at least one opening 11, and the inner surfaces of the storage 10c, 10d together with an imaginary closing surface defines a storage volume 15. In the storage 10c, 10d of FIG. 2c and FIG. 2d the opening 11 is formed in an upper surface.

Figure 3:
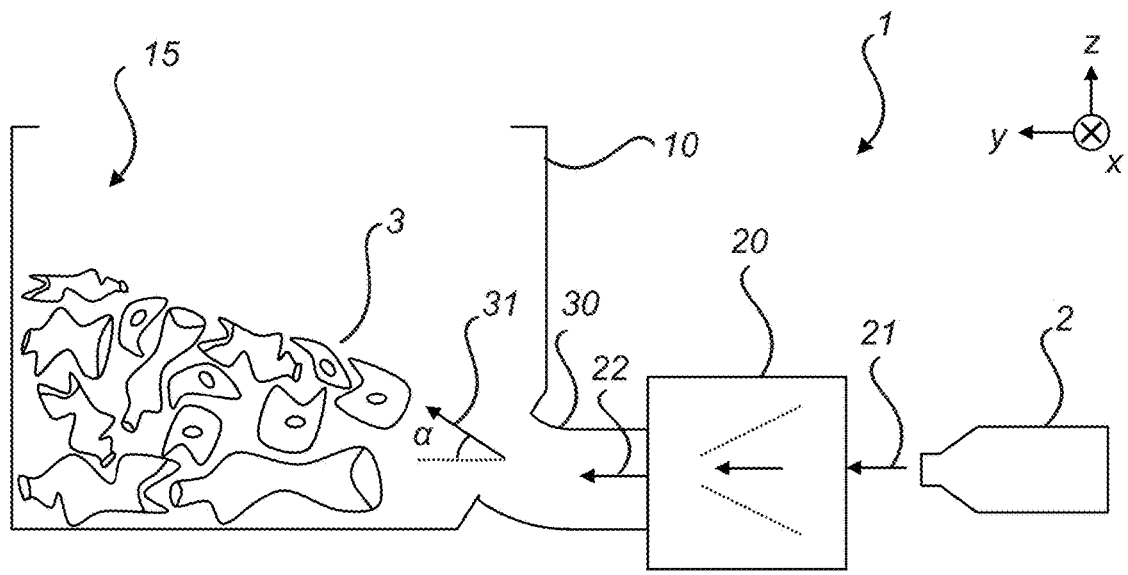
FIG. 3 depicts a cross-sectional view of a system for storing recyclable containers with a force feeding mechanism represented by a box.

In FIG. 3 there is depicted a cross-sectional view of a container 2, a transporting channel 30 directed upwards from the horizontal plane at an angle α at the outlet port of the transporting channel. The force feeding transportation mechanism (represented by a box 20) is adapted to act on containers 2 to move them through the transporting channel 30 into the storage volume 15. FIG. 3 thus illustrates a system for storing recyclable containers 1 according to embodiments of the present invention. The storage 10 has a storage volume 15 for housing containers 3. The transportation channel 30 comprises an inlet port 22 and an outlet port 31. The inlet port 22 is adapted to receive compressed or uncompressed recyclable containers 2 and the outlet port 31 is attached to or passes through at least one of the inner surfaces of the storage 10. The force feeding transporting mechanism 20 is configured to transfer at least one recyclable container 2 through the transporting channel 30 into the storage volume 15 via the outlet port 31. The force feeding transporting mechanism 20 may additionally be configured to compress the recyclable containers 2 prior to or while they are transported. According to one example, at least a portion of the force feeding transporting mechanism 20 extends into and is movable within the transporting channel 30. Pressurised air may ejected into the transporting channel. For instance, the force feeding transporting mechanism 20 may be a feeder arranged within the transporting channel 30, and receives one or more recyclable container(s) 2 through an inlet port 21 in the transporting channel (e.g. plunger) and/or in the of the force feeding mechanism 20 (e.g. screw feeder), and ejects it into the storage.

Additionally, the force feeding transporting mechanism 20 may be configured to also compress the containers 2, 3. As the containers 2, 3 are force fed by the force feeding transporting mechanism 20 into or through the transporting channel 30 they may compressed by the force feeding transporting mechanism 20. For example, containers 2 have a compression ratio of one (uncompressed) prior to being force fed by the force feeding transporting mechanism 20 into or through the transporting channel 30 and a compression ratio of five after having been processed by the force feeding transporting mechanism 20. Accordingly, the system for storing recyclable containers 1 may additionally be adapted to compress recyclable containers 2. The containers 3 having entered the storage volume 15 may thus have a higher compression ratio or the same compression ratio as the containers 2 entering the system.

The transporting channel 30 is dimensioned and directed such that the mean or average direction in which containers 2, 3 are forced into the storage 10 forms an angle α of between 15° and 85° with the horizontal plane at the outlet of the transporting channel 30. With the coordinate system defined by the cartesian XYZ-vectors of FIG. 3 the horizontal plane is spanned by the X and Y vectors. The purpose of the transporting channel 30 is to introduce a Z component to the in-feeding force of the containers 2, 3. Depending on the direction of the transporting channel 30 relative the XY-plane the portion of the force being directed in the Z-direction can be adjusted.

The transporting channel 30 may be large enough to encompass a plurality or a bulk of containers 2, 3. The plurality or bulk of containers 2, 3 present in the transporting channel 30 may push against each other and be ejected into the storage 10 by a force applied directly or indirectly (e.g. via other containers) by the force feeding transporting mechanism 20.

The system may be configured such that e.g. at least 70% of the containers in the storage have a compression ratio of between three and ten, and preferably between four and eight. By selecting the angle at which the transporting channel is directed upwards α after at least one of the dimensions of the storage 10, the maximum transporting power of the transporting mechanism 20 and the maximum power of compression for the transporting mechanism 20 the system may be configured to achieve such proper compression.

As mentioned in the above, the properties of the system may be selected to achieve proper compression ratio. In many scenarios, the angle α at which the transporting channel 30 is directed upwards at the outlet from the horizontal plane (XY-plane) is within an angle range wherein the range is chosen from a group comprising 15° to 85°, 15° to 60°, 30° to 50°, and 30° to 45°.

In one exemplary embodiment the storage 10 is a 10 m³ waste container of dimensions 3800 mm×1890 mm×2000 mm (Length×Width×Height) in combination with a transporting channel 30 directed approximately 45° from the horizontal plane. The transporting channel 30 may be located in a lower half-portion or even lower quarter-portion of the storage 10. Additionally, in this exemplary embodiment a screw feeder is used as the force feeding mechanism 20 for transporting and compressing the containers 2, 3. The screw feeder having a jaw against through which the containers 2,3 are pushed by the rotating screw and the screw feeder comprises an actuator which holds the jaw down at a predetermined maximum power rating. With such or similar setups co-mingled or PET containers 2, 3 may be inserted into the screw feeder uncompressed to be compressed and stored at an suitable compression ratio in the storage 10.

Experiments have shown that for a given force feeding transporting mechanism 20 (which may also compress the containers 2, 3) a same operational power (which drives the force feeding transporting mechanism 20) may be used for feeding containers of both an only plastic composition (unmixed) or a co-mingled (mixed) composition with both plastic and aluminium containers. Accordingly, a same system for storing recyclable containers may be used for suitable storing of a same type of containers or co-mingled containers. Thus, separate systems for storing different compositions of containers does not have to provided. A same system may e.g. be used during a first session to store PET type containers and during a second session used to store co-mingled containers.

According to experiments, a suitable compaction ratio of between approximately five to six was achieved for PET containers while the same system 1 and using the same operational power for the transporting mechanism 20, used to store co-mingled containers, also achieved a suitable compression ratio wherein the containers where easy to separate.

It is understood that for other types or mixes of containers 2, 3, other dimensions of the storage 10, other force feeding mechanisms 20 and other angles α with which the transporting channel 30 should be directed upwards from the horizontal plane would be preferable.

Also depicted in FIG. 3 is a transporting channel 30 arranged in a lower half portion of the storage 10. The outlet port of the transporting channel 30 is arranged at or below the midpoint of an average or maximum vertical height (in the Z-direction of the coordinate system) of the storage 10. Similarly, the outlet port of the transporting channel 30 may be arranged in a lower quarter-portion of the storage 10 or neighbouring a bottom or floor inner surface of the storage 10. The lower quarter-portion being defined in a manner analogous to the lower half-portion. With the outlet of the transporting channel 30 arranged in the lower half-portion the storage (i.e. in the inner surfaces of the lower half of the storage 10) the storage is filled with recyclable containers from the bottom.

In some embodiments the outlet port of the force feeding transporting mechanism 30 is attached to at least one of the inner surfaces of the storage 10 wherein the output of the force feeding transporting mechanism is directed upwards from the horizontal plane at an angle α within the range of 15° and 85°. It is understood that the same features and benefits of the upwards directed transporting channel 30 are valid also for a force feeding transporting mechanism 20 which is in direct communication with the storage 10 and directed upwards at an angle α within the range of 15° and 85° at the outlet port of the force feeding transporting mechanism 20.

Figure 4:
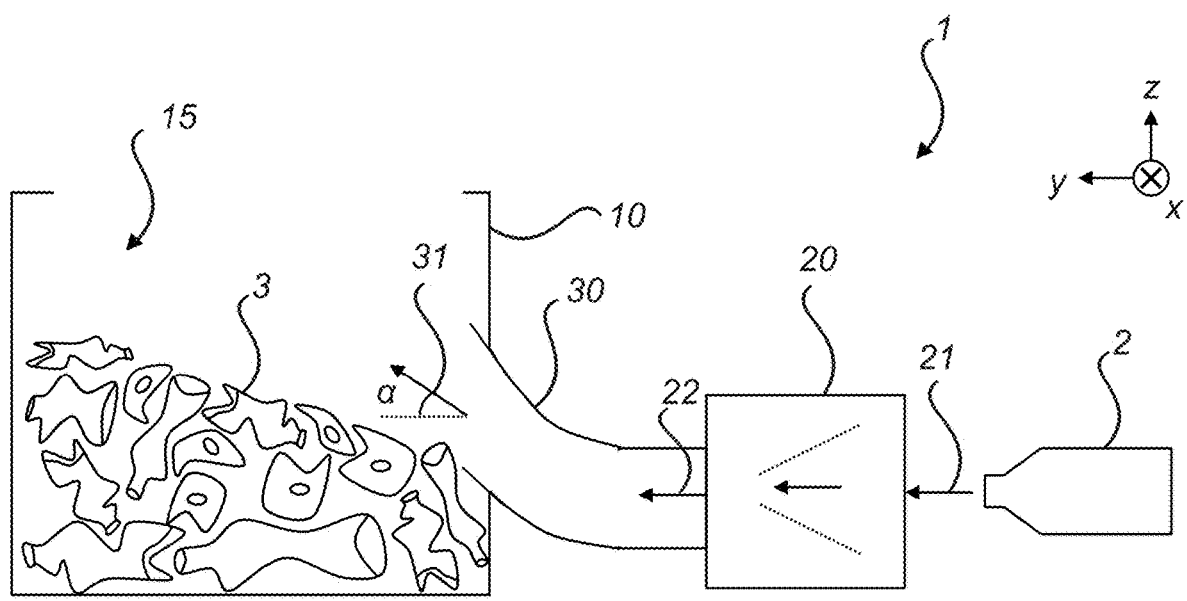
FIG. 4 depicts a cross-sectional view of a system for storing recyclable containers with a force feeding mechanism represented by a box.

With further reference to FIG. 4 there is depicted another exemplary embodiment of a system for storing recyclable containers 1. The transportation channel 30 may be directed upwards at an angle of a to the horizontal plane (XY-plane) such that the mean or main direction in which containers 2, 3 are forced when ejected into the storage 10 is directed upwards from the horizontal plane at an angle α. It is understood that the direction of the transportation channel 30 is not necessarily equal to the normal of an imaginary closing surface of the outlet port of the transporting channel 30. For instance, in the embodiment depicted in FIG. 4 the normal of a imaginary closing surface for the outlet port of the transportation channel 30 is in the horizontal direction while the mean or main direction of the forced travel for the containers 2, 3 is upwards from the horizontal plane (XY-plane) at an angle α. It is the curvature and configuration of the transporting channel 30, especially the portion of the transporting channel 30 being closest to the outlet port of the transporting channel, that mainly influences the forced direction of travel for the containers 2, 3.

Figure 5:
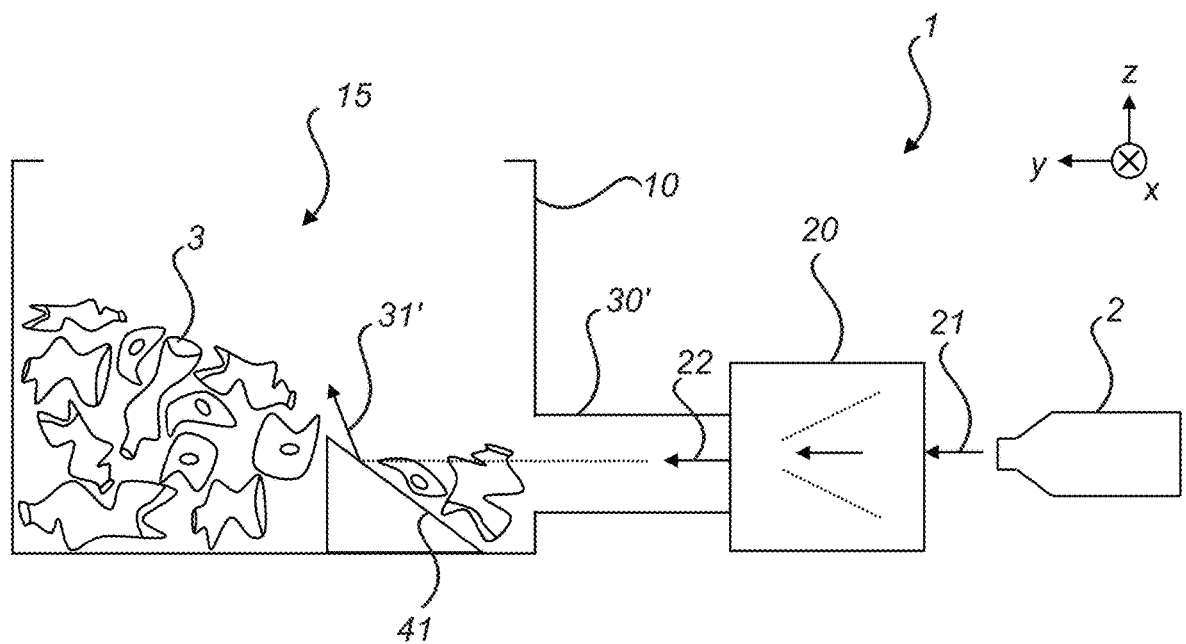
FIG. 5 depicts a cross-sectional view of a system for storing recyclable containers comprising a wedge or ramp and a force feeding mechanism represented by a box.

With reference to FIG. 5 there is illustrated a further exemplary embodiment of a system for storing recyclable containers 1. The storage 10 further comprising a wedge 41 or ramp 41 which intersects the main or mean direction of forced travel of the containers 2, 3 being ejected by the transporting channel 30' into the storage 10. The wedge 41 or ramp 41 intersects the main or mean direction of forced travel of the containers 2, 3 with an ascending surface face, the ascending surface forming an acute angle with the horizontal plane. The wedge 41 or ramp 41 forms an acute angle of between 15° to 85°, 15° to 60°, 30° to 50°, or 30° to 45° with the horizontal plane (XY-plane) and is adapted to deflect the containers 2, 3 being force fed into the storage 10 further upwards into the storage 10. Accordingly, in combination with a ramp 41 or wedge 41 configured to deflect the containers 2, 3 upwards the transporting channel 30 may be configured to force feed the containers 2, 3 in a direction parallel to the horizontal plane (XY-plane), upwards or even downwards. As the containers 2, 3 push up against the wedge 41 or ramp 41 they are deflected upwards at a deflection direction 31'.

Figure 6:
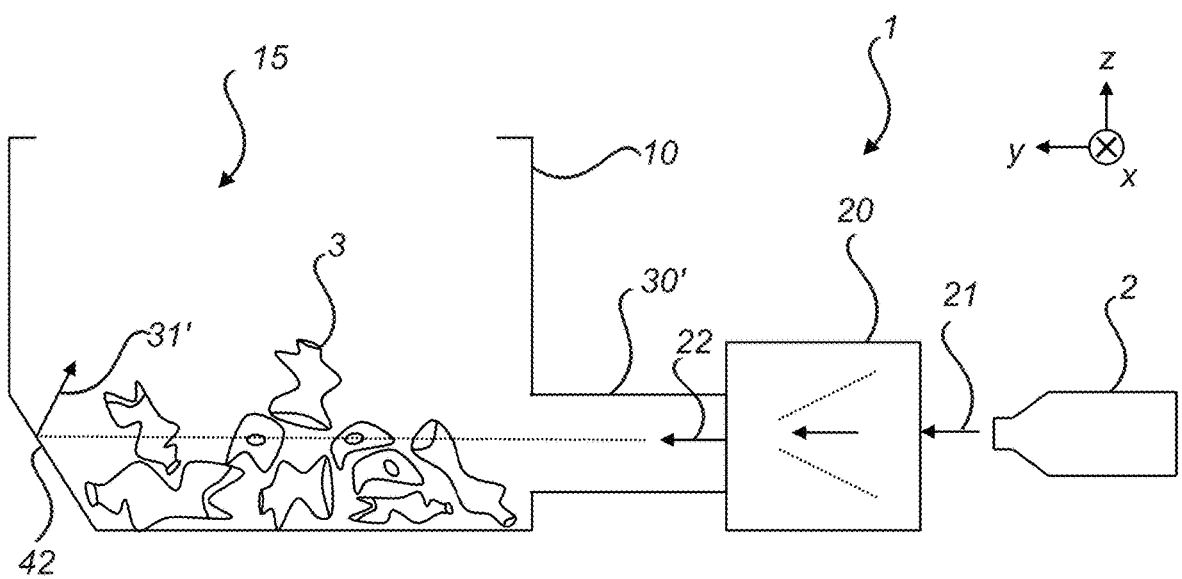
FIG. 6 depicts a cross-sectional view of a system for storing recyclable containers comprising an inclined surface and a force feeding mechanism represented by a box.

FIG. 6 depicts an embodiment of the present invention with an inclined far side 42, which facilitates the storing of recyclable containers 2, 3 in fashion similar to the ramp or wedge as described in the above. The inclined far side 42 intersects the main or mean direction of forced travel of the containers 2, 3 being ejected by the transporting channel 30' into the storage 10. The inclined far side 42 intersects the main or mean direction of forced travel of the containers 2, 3 with an ascending surface face, the ascending surface forming an acute angle with the horizontal plane. The inclined far side 42 forms an acute angle of between 15° to 85°, 15° to 60°, 30° to 50°, or 30° to 45° with the horizontal plane (XY-plane) and is adapted to deflect the containers 2, 3 being force fed into the storage 10 further upwards into the storage 10 at a deflection direction 31'.

In FIG. 5 and FIG. 6 there is illustrated a horizontal transporting channel 30' configured such that the main or mean forced direction of travel of the containers 2, 3, while being ejected into the storage 10, is horizontal. The ramp 41, wedge 41 or inclined far side 42 may be individual separate components adapted to be fastened to the storage 10 or they may form part of the inner surfaces of the storage 10.

Figure 7:
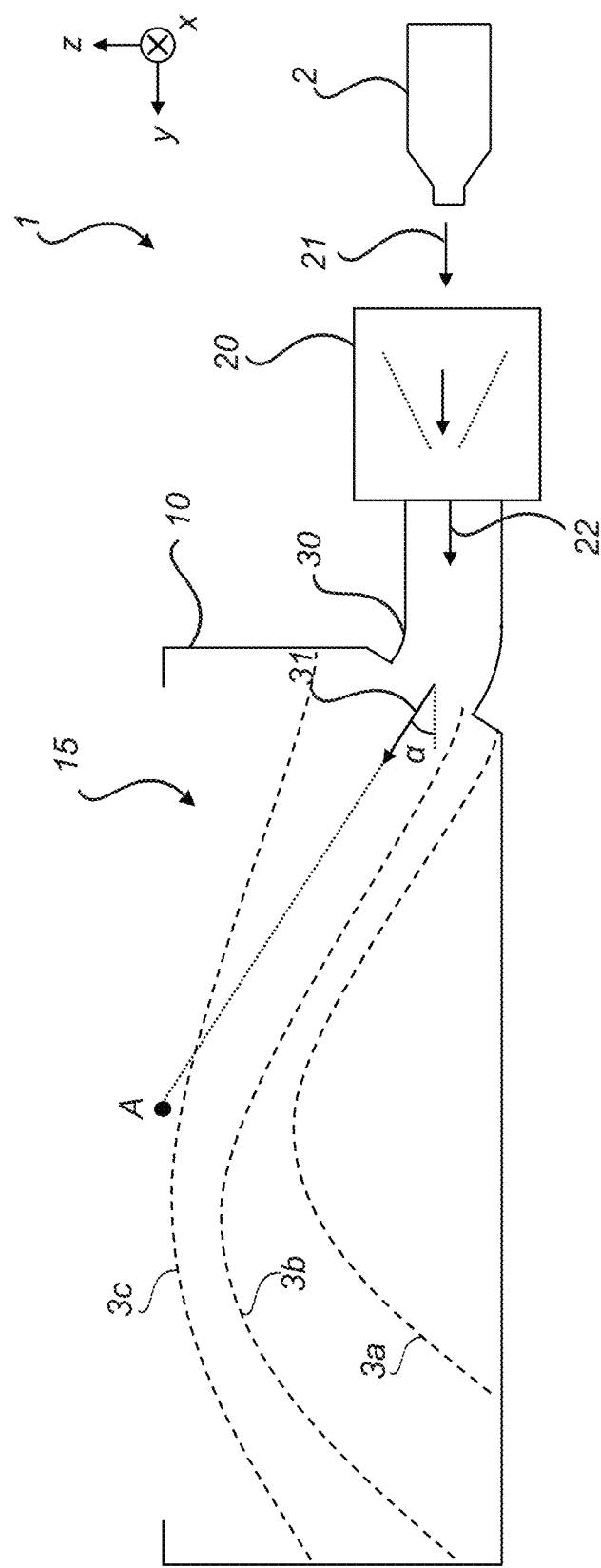
FIG. 7 depicts a cross-sectional view of a system for storing recyclable containers with a force feeding mechanism represented by a box during a filling procedure.

FIG. 7 depicts a cross sectional view of a system for storing recyclable containers 1. In FIG. 7 it is further depicted that an imaginary extension of the direction at which the containers forced while being ejected into the storage 10 intersects a top centre-point A.

The system comprising a storage 10 for housing the containers 2, 3, a transporting channel 30 directed upwards from the horizontal plane (XY-plane) at an angle α at the outlet port of the transporting channel and a force feeding transporting mechanism 20 (represented by a box). Further illustrated is the filling procedure of containers inside the storage volume 15. Initially, at a first filling stage 3a the containers 2 may merely fall into the storage 10 and pile up on a floor of the storage 10. New containers 2 ejected into the storage may spend some time at free-fall falling into the storage 10. At a second filling stage 3b the containers have piled us such that the outlet port of the transporting channel is at least partially covered by containers 2, 3b inside the storage 10. As new containers 2 are ejected into the storage 10 they push against containers 3b already present in the storage 10. At a third filling stage 3c the storage 10 approaches being filled of recyclable containers 2, the outlet port of the transporting channel 30 being submerged among containers 2 in the storage volume 15.

Additionally, FIG. 7 depicts a transporting channel 30 which directs the containers 2 in a direction oriented upwards from the horizontal plane at angle α, wherein the direction intersects a top centre-point A of the storage 10. For example, if the storage 10 is a cuboid with the outlet port of the transporting channel 30 being placed adjacent at a lower half-portion of the storage volume 15, at a lower quarter portion of the storage volume 15 or adjacent to a bottom surface of the storage 10 the transporting channel may be directed upwards at an angle α equal to invtan(2H/D) where H is the height of the cuboid and D is depth of cuboid as perceived from the outlet port of the transporting channel 30. In general, the angle at which the transporting channel 30 should be directed upwards from the horizontal plane to intersect the centre point for a storage volume 15 shaped as a cuboid may be determined as invtan(2(H−d)/D) wherein d is the displacement of the centre point of an imaginary closing surface of the outlet port of the transporting channel 30 from a bottom or floor inner side of the storage 10. It is understood that from the positioning of the transporting channel 30 and the shape of the storage 10 the angle α at which the containers 2 are directed, such that the direction intersects the centre point A, may be determined.

Furthermore, achieving proper compression ratio or maintaining of a proper compression ratio of the containers 2 with the system for storing recyclable containers 1 may be improved by the transporting channel 30 being directed such that the main or average direction in which the containers are ejected into the storage 10 intersects a centred half-area of an upper surface of the storage volume 15. With such an arrangement the containers 2 are directed upwards sufficiently so as to reduce pile-up against a far inner surface and thereby reducing the number of containers that becomes too compressed. With an exemplary storage volume 15 shaped as a cuboid the centred half-area upper surface is a cantered rectangle, having the same aspect ratio as the (open or closed) top surface of the cuboid but shorter sides and half the area.

Figure 8:
FIG. 8 is an image of a first type of storage housing according to embodiments of the present invention.

FIG. 8 depicts an image of an exemplary storage housing, the storage housing being an open-top waste container.

Figure 9:
FIG. 9 is an image of a second type of storage housing according to embodiments of the present invention.

FIG. 9 depicts an image of another exemplary storage housing. The storage housing in FIG. 9 is a Big-Bag made of a flexible plastic material. The Big-Bag storage of FIG. 9 is preferably used in combination with an outer support structure which supports the Big-Bag from at least one side during filling. In some embodiments the outer support structure forms three essentially vertical wall portions, wherein one wall is the far-wall with respect to the direction at which the containers are forced out of the outlet port of the transporting channel and the other two walls are arranged adjacent and perpendicular to the far-wall such that the walls facilitate that the Big-Bag maintains a cuboid shape. After filling, the big bag may be removed from the outer support structure. In other embodiments wherein the storage is made out of a flexible material other suitable outer support structures may be arranged around the storage during filling, such that the storage may be shaped into a suitable shape.

The skilled person in the art realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A system for storing recyclable containers, said system comprising:
   a storage for housing recyclable containers, said storage having a set of inner surfaces which defines a storage volume for said recyclable containers;
   a transporting channel, said transporting channel comprising an inlet port and an outlet port, wherein said inlet port is arranged to receive compressed and/or uncompressed recyclable containers, and said outlet port is directly attached to at least one of said inner surfaces in said set of inner surfaces,
   a force feeding transporting mechanism configured to transfer at least one recyclable container through said transporting channel and into said storage volume via said outlet port, wherein,
   said transporting channel is directed upwards from the horizontal plane at an angle within the range of 15° and 85° at the outlet port of said transporting channel.

2. A system for storing recyclable containers according to claim 1, wherein at least 80% of said recyclable containers has a compression ratio of between 3 and 10.

3. A system for storing recyclable containers according to claim 1, said angle being within an angle range, wherein said angle range is chosen from a group of angle ranges comprising:
   15° to 60°,
   30° to 50°, and
   30° to 45°.

4. A system for storing recyclable containers according to claim 1, wherein said angle at which said transporting channel is directed upwards is selected such that it intersects a centered half-area of an upper surface of said storage volume.

5. A system for storing recyclable containers according to claim 1, wherein said outlet port of said transporting channel is arranged in a lower half-portion of said storage.

6. A system for storing recyclable containers, said system comprising:
   a storage for housing recyclable containers, said storage having a set of inner surfaces which defines a storage volume for said recyclable containers;
   a transporting channel, said transporting channel comprising an inlet port and an outlet port, wherein said inlet port is arranged to receive compressed and/or uncompressed recyclable containers, and said outlet port is attached to at least one of said inner surfaces in said set of inner surfaces,
   a force feeding transporting mechanism configured to transfer at least one recyclable container through said transporting channel and into said storage volume via said outlet port, wherein,
   said outlet port of said transporting channel is directed upwards from the horizontal plane at an angle within the range of 15° and 85°.

7. A system for storing recyclable containers according to claim 6, wherein at least 80% of said recyclable containers has a compression ratio of between 3 and 10.

8. A system for storing recyclable containers according to claim 6, said angle being within an angle range, wherein said angle range is chosen from a group of angle ranges comprising:

15° to 60°,
30° to 50°, and
30° to 45°.

9. A system for storing recyclable containers according to claim 6, wherein said angle at which said outlet port of said transporting channel is directed upwards is selected such that it intersects a centered half-area of an upper surface of said storage volume.

10. A system for storing recyclable containers according to claim 6, wherein said outlet port of said transporting channel is arranged in a lower half-portion of said storage.

11. A system for storing recyclable containers, said system comprising:

a storage for housing recyclable containers, said storage having a set of inner surfaces which defines a storage volume for said recyclable containers;

a transporting channel, said transporting channel comprising an inlet port and an outlet port, wherein said inlet port is arranged to receive compressed and/or uncompressed recyclable containers, and said outlet port is attached to at least one of said inner surfaces in said set of inner surfaces, a force feeding transporting mechanism configured to transfer at least one recyclable container through said transporting channel and into said storage volume via said outlet port, wherein said transporting channel is directed upwards from the horizontal plane at an angle within the range of 15° and 85° at the outlet port of said transporting channel such that a movement of the recyclable container comprises a vertical component directed upward as it is transferred into said storage volume, which movement is effectuated by said force feeding mechanism, and wherein said outlet port of said transporting channel is arranged in a lower half-portion of said storage.

12. A system for storing recyclable containers according to claim 11, wherein at least 80% of said recyclable containers has a compression ratio of between 3 and 10.

13. A system for storing recyclable containers according to claim 11, said angle being within an angle range, wherein said angle range is chosen from a group of angle ranges comprising:

15° to 60°,
30° to 50°, and
30° to 45°.

14. A system for storing recyclable containers according to claim 11, wherein said angle at which said transporting channel is directed upwards is selected such that it intersects a centered half-area of an upper surface of said storage volume.

\* \* \* \* \*